US006855173B2

(12) United States Patent
Ehrnsperger et al.

(10) Patent No.: US 6,855,173 B2
(45) Date of Patent: Feb. 15, 2005

(54) USE OF ABSORBENT MATERIALS TO SEPARATE WATER FROM LIPOPHILIC FLUID

(75) Inventors: Bruno Johannes Ehrnsperger, Bad Soden (DE); Paul Amaat France, West Chester, OH (US); Arseni V. Radomyselski, Hamilton, OH (US); Jean Wevers, Steenhuffel (BE)

(73) Assignee: Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 09/849,554

(22) Filed: May 4, 2001

(65) Prior Publication Data

US 2002/0017493 A1 Feb. 14, 2002

Related U.S. Application Data

(60) Provisional application No. 60/280,075, filed on Mar. 30, 2001, provisional application No. 60/261,679, filed on Jan. 12, 2001, provisional application No. 60/241,174, filed on Oct. 17, 2000, provisional application No. 60/209,468, filed on Jun. 5, 2000, provisional application No. 60/209,444, filed on Jun. 5, 2000, provisional application No. 60/209,443, filed on Jun. 5, 2000, and provisional application No. 60/209,250, filed on Jun. 5, 2000.

(51) Int. Cl.$^7$ .............................. B01D 15/00; D06B 9/06
(52) U.S. Cl. .......................... 8/142; 210/663; 210/670; 210/679; 210/689; 210/694
(58) Field of Search ................. 210/670, 679, 210/689, 484, 502.1, 503, 505, 663, 669, 694; 510/285, 175, 466, 165, 289, 283; 8/142, 158; 252/545, 8.6, 153, 547, 171, 174.5, 542; 134/7, 40, 10

(56) References Cited

U.S. PATENT DOCUMENTS

| 3,441,501 A | * | 4/1969 | Segall et al. ................. 210/670 |
| 3,635,667 A | | 1/1972 | Keay et al. ..................... 8/142 |
| 3,663,160 A | | 5/1972 | Stone et al. .................... 8/137 |
| 3,733,267 A | * | 5/1973 | Haase .......................... 210/669 |
| 3,854,871 A | | 12/1974 | Eanzel et al. ................... 8/142 |
| 4,077,770 A | | 3/1978 | Rouvellat et al. ............... 8/142 |
| 4,097,397 A | | 6/1978 | Mizutani et al. ............ 252/153 |
| 4,102,824 A | | 7/1978 | Mizutani et al. ............ 252/545 |
| 4,111,034 A | | 9/1978 | Hubner ...................... 73/31.06 |
| 4,118,344 A | | 10/1978 | DeShon ....................... 252/559 |
| 4,137,044 A | | 1/1979 | Flower et al. ................... 8/137 |
| 4,207,072 A | | 6/1980 | Schuierer et al. ............... 8/137 |
| 4,267,077 A | | 5/1981 | Niimi et al. ................. 252/545 |
| 4,309,247 A | * | 1/1982 | Hou et al. ................... 210/505 |
| 4,340,766 A | | 7/1982 | Klahr et al. ................. 568/625 |
| 4,584,092 A | | 4/1986 | Kanematu et al. .......... 208/188 |
| 4,604,205 A | | 8/1986 | Ayers et al. ............. 210/497.2 |
| 4,685,930 A | * | 8/1987 | Kasprzak ..................... 8/139.1 |
| 4,708,807 A | | 11/1987 | Kemerer ...................... 252/8.6 |
| 4,747,960 A | * | 5/1988 | Freeman et al. ............ 210/689 |
| 4,761,896 A | | 8/1988 | Miyata .......................... 34/77 |
| 4,909,962 A | | 3/1990 | Clark ......................... 252/547 |
| 5,037,485 A | | 8/1991 | Chromecek et al. ............ 134/7 |
| 5,046,337 A | | 9/1991 | Ro et al. ...................... 68/18 F |
| 5,057,240 A | | 10/1991 | Madore et al. .............. 510/328 |
| 5,116,426 A | | 5/1992 | Asano et al. .................. 134/40 |
| 5,271,775 A | | 12/1993 | Asano et al. .................. 134/40 |
| 5,302,313 A | | 4/1994 | Asano et al. ................. 252/171 |
| 5,360,571 A | | 11/1994 | Kilgour et al. ......... 252/174.15 |
| 5,443,747 A | | 8/1995 | Inada et al. .................... 252/94 |
| 5,503,681 A | | 4/1996 | Inada et al. ..................... 134/1 |
| 5,503,778 A | | 4/1996 | Liu et al. ..................... 252/542 |
| 5,520,827 A | | 5/1996 | Danner ........................ 252/8.6 |
| 5,593,507 A | | 1/1997 | Inada et al. ................... 134/11 |
| 5,597,792 A | | 1/1997 | Klier et al. .................. 510/417 |
| 5,628,883 A | | 5/1997 | Klier et al. .................. 510/417 |
| 5,676,705 A | | 10/1997 | Jureller et al. ................. 8/142 |
| 5,683,473 A | | 11/1997 | Jureller et al. ................. 8/142 |
| 5,683,977 A | | 11/1997 | Jureller et al. .............. 510/286 |
| 5,690,750 A | | 11/1997 | Inada et al. ................... 134/11 |
| 5,705,562 A | | 1/1998 | Hill ............................. 524/731 |
| 5,707,613 A | | 1/1998 | Hill .......................... 424/78.03 |
| 5,716,456 A | | 2/1998 | Inada et al. ................... 134/10 |
| 5,722,781 A | | 3/1998 | Yamaguchi .................. 400/61 |
| 5,741,365 A | | 4/1998 | Inada et al. ..................... 134/1 |
| 5,769,962 A | | 6/1998 | Inada et al. ................... 134/29 |
| 5,783,092 A | | 7/1998 | Brown et al. ................ 210/759 |
| 5,811,383 A | | 9/1998 | McCormack et al. ......... 134/26 |
| 5,929,012 A | | 7/1999 | Del Duca et al. ............ 510/303 |
| 5,942,007 A | | 8/1999 | Berndt et al. ................. 8/142 |
| 5,944,996 A | | 8/1999 | DeSimone et al. ......... 210/634 |
| 5,954,869 A | | 9/1999 | Elfersy et al. .......... 106/287.16 |
| 5,977,040 A | | 11/1999 | Inada et al. ................. 510/165 |
| 5,977,045 A | | 11/1999 | Murphy ...................... 510/289 |

(List continued on next page.)

FOREIGN PATENT DOCUMENTS

| CA | 1 239 326 | 7/1988 |
| DE | 2108 991 | 8/1972 |
| DE | 4131589 A1 | 5/1986 |

(List continued on next page.)

OTHER PUBLICATIONS

Trilo et al.; "Critical Micelle Density for the Self–Assembly of Block Copolymer Surfactants in Supercritical Carbon Dioxide"; pp. 416–421.
Sarbu et al.; "Non–Fluorous Polymers with Very High Solubility in Supercritical $CO_2$ Down to Low Pressures"; pp. 165–168.
XP 00218007 (Abstract).
XP 002180808 (Abstract only).
XP 002180809 (Abstract only).
XP 002180810 (Abstract only).

*Primary Examiner*—Ivars C. Cintins
(74) *Attorney, Agent, or Firm*—Caroline Wei-Berk; C. Brant Cook; Kim W. Zerby

(57) ABSTRACT

The present invention relates to the use of absorbent materials for separating water from an emulsion comprising water and lipophilic fluid. The methods, systems, and compositions of the present invention expose the emulsion to absorbent materials such that water is absorbed out of the emulsion in order to facilitate the recovery of the lipophilic fluid.

16 Claims, No Drawings

U.S. PATENT DOCUMENTS

| | | | |
|---|---|---|---|
| 5,985,810 A | 11/1999 | Inada et al. ................. 510/175 |
| 6,001,123 A | 12/1999 | DeYoung et al. .............. 8/142 |
| 6,013,683 A | 1/2000 | Hill et al. ..................... 516/67 |
| 6,042,617 A | 3/2000 | Berndt .......................... 8/142 |
| 6,042,618 A | 3/2000 | Berndt et al. .................. 8/142 |
| 6,056,789 A | 5/2000 | Berndt et al. .................. 8/142 |
| 6,059,845 A | 5/2000 | Berndt et al. .................. 8/142 |
| 6,060,546 A | 5/2000 | Powell et al. ................ 524/267 |
| 6,063,135 A | 5/2000 | Berndt et al. .................. 8/142 |
| 6,086,635 A | 7/2000 | Berndt et al. .................. 8/142 |
| 6,114,295 A | 9/2000 | Murphy ....................... 510/286 |
| 6,131,421 A | 10/2000 | Jureller et al. ................. 68/13 |
| 6,136,766 A | 10/2000 | Inada et al. ................. 510/167 |
| 6,148,644 A | 11/2000 | Jureller et al. ................. 68/13 |
| 6,156,074 A | 12/2000 | Hayday et al. ................. 8/142 |
| 6,177,399 B1 | 1/2001 | Mei et al. ................... 510/466 |
| 6,200,352 B1 | 3/2001 | Romack et al. ................ 8/142 |
| 6,200,393 B1 | 3/2001 | Romack et al. ............... 134/10 |
| 6,200,943 B1 | 3/2001 | Romack et al. ............. 510/285 |
| 6,204,233 B1 | 3/2001 | Smith et al. ................ 510/285 |
| 6,228,826 B1 | 5/2001 | DeYoung et al. ........... 510/283 |
| 6,242,408 B1 | 6/2001 | Elms et al. ................. 510/375 |
| 6,310,029 B1 | 10/2001 | Kilgour et al. ............. 510/175 |
| 6,313,079 B1 | 11/2001 | Murphy et al. ............. 510/285 |
| 6,368,359 B1 | 4/2002 | Perry et al. .................... 8/142 |
| 2001/0004062 A1 | 6/2001 | Rutledge et al. ............ 210/315 |

FOREIGN PATENT DOCUMENTS

| | | | |
|---|---|---|---|
| DE | 3739711 A | 6/1989 |
| DE | 296 00 628 U1 | 6/1997 |
| DE | 196 49 150 A1 | 5/1998 |
| DE | 198 10907 A1 | 9/1999 |
| EP | 1 451 600 A | 10/1976 |
| EP | 0 091 261 A2 | 10/1983 |
| EP | 0 118 625 A2 | 9/1984 |
| EP | 0182583 A2 | 5/1986 |
| EP | 0410 068 A1 | 1/1991 |
| EP | 0 422 787 A2 | 4/1991 |
| EP | 0 566 240 A1 | 10/1993 |
| EP | 0 669 152 A1 | 8/1995 |
| EP | 0 679 754 A2 | 11/1995 |
| EP | 0 716 870 A1 | 6/1996 |
| EP | 0 479 146 B1 | 12/1996 |
| EP | 0 767 267 A1 | 4/1997 |
| EP | 0 962519 A1 | 12/1999 |
| EP | 1 041 189 A1 | 10/2000 |
| EP | 1 043 443 A1 | 10/2000 |
| EP | 1 092 803 A1 | 4/2001 |
| FR | 2 268 898 A1 | 11/1975 |
| GB | 1 509 315 | 5/1978 |
| GB | 2 084 204 A | 4/1982 |
| GB | 2 230 022 A | 10/1990 |
| GB | 2 251 867 A | 7/1992 |
| JP | 62057491 A | 9/1985 |
| JP | 1098-798 A | 5/1986 |
| JP | 3046-300 A | 2/1988 |
| JP | 3063-799 A | 3/1988 |
| JP | 1188-595 A | 7/1989 |
| JP | 2222-496 A | 4/1990 |
| JP | 2166-198 A | 6/1990 |
| JP | 2202-599 A | 8/1990 |
| JP | 04323299 A | 11/1992 |
| JP | 05051598 A | 3/1993 |
| JP | 05239766 A | 9/1993 |
| JP | 08073837 A | 3/1996 |
| JP | 09143497 A | 6/1997 |
| JP | 10-017891 | 1/1998 |
| JP | 11-092784 | 4/1999 |
| JP | 11-323381 | 11/1999 |
| JP | 11-323383 | 11/1999 |
| JP | 00144175 A | 5/2000 |
| JP | 2000-192085 | 7/2000 |
| JP | 00290689 A | 10/2000 |
| WO | WO 82/02218 A1 | 7/1982 |
| WO | WO 94/01227 A1 | 1/1994 |
| WO | WO 96/30471 A2 | 10/1996 |
| WO | WO 97/35061 A1 | 9/1997 |
| WO | WO 98/07405 A1 | 2/1998 |
| WO | WO 98/16615 A1 | 4/1998 |
| WO | WO 99/06507 | 2/1999 |
| WO | WO 99/57358 | 11/1999 |
| WO | WO 00/04221 | 1/2000 |
| WO | WO 00/04222 | 1/2000 |
| WO | WO 00/27903 | 5/2000 |
| WO | WO 00/63340 | 10/2000 |
| WO | WO 01/06051 A1 | 1/2001 |
| WO | WO 01/34613 A1 | 5/2001 |
| WO | WO 01/34706 A1 | 5/2001 |
| WO | WO 01/40567 A1 | 6/2001 |
| WO | WO 01/93977 A2 | 12/2001 |

* cited by examiner

USE OF ABSORBENT MATERIALS TO SEPARATE WATER FROM LIPOPHILIC FLUID

RELATED APPLICATIONS

This application claims priority under 35 U.S.C. 119(e) to U.S. Provisional Application Ser. Nos. 60/209,468, 60/209,250, 60/209,443 and 60/209,444 all of which were filed on Jun. 5, 2000; 60/241,174, filed on Oct. 17, 2000; 60/261,679 filed on Jan. 12, 2001; and 60/280,075, filed on Mar. 30, 2001.

FIELD OF THE INVENTION

The present invention relates to the use of absorbent materials for separating water from an emulsion comprising water and lipophilic fluid. The methods, systems, and compositions of the present invention expose the emulsion to absorbent materials such that water is absorbed out of the emulsion in order to facilitate the recovery of the lipophilic fluid.

BACKGROUND OF THE INVENTION

Conventional laundering techniques for the cleaning and treatment of fabric articles such as garments have long involved both traditional aqueous based washing and a technique commonly referred to as "dry cleaning". Traditional aqueous based washing techniques have involved immersion of the fabric articles in a solution of water and detergent or soap products followed by rinsing and drying. However, such conventional immersion cleaning techniques have proven unsatisfactory on a wide range fabric articles that require special handling and/or cleaning methods due to a fabric content, construction, etceteras, that is unsuitable for immersion in water.

Accordingly, the use of the laundering method of "dry cleaning" has been developed. Dry cleaning typically involves the use of non-aqueous, lipophilic fluids as the solvent or solution for cleaning. In this manner, fabrics that are incompatible with water immersion may be cleaned and treated without the potential disastrous side effects water may present.

While a broad range of non-aqueous lipophilic fluids are available, many require the presence of low levels of water in the form of emulsions or microemulsions to maximize cleaning efficiency without sacrificing the "safety" accorded fabrics via dry cleaning. In addition, it is desirable to re-cycle and/or purify these non-aqueous, lipophilic fluids to reduce the much higher operating cost associated with dry cleaning as opposed to its aqueous based cousin. However, prior to purifying the lipophilic fluid, it is desirable to separate water from the emulsion prior to some of the lipophilic purification steps. Thus, a cost-effective, efficient, and safe way to separate water from these emulsions is desired, particularly when adjuncts such as emulsifiers are utilized.

U.S. Pat. Nos. 4,555,344, 4,828,710, and European Application EP 648,521 A2 disclose the use of absorptive materials to separate low molecular weight solvents from an emulsion or aqueous solution containing higher molecular weight solutes. However, it has been surprisingly discovered that gels not only selectively remove water from macromolecular solutions but also from lipophilic fluid solutions.

Traditional separation techniques for dry cleaning solvent/water emulsions and/or mixtures typically involve distillation of all solvent-containing fluids, including those that do not require it. In this regard, distillation is used not only to remove impurities such as body soils from the post-use dry cleaning solvent, but is also used to separate solvent from water—a function that can be carried out in other ways. Distillation often involves high operating costs in the form of energy and equipment necessary to achieve the separation and, thus is undesirable in many instances, particularly when the equipment is within a consumer's home. Lastly, as noted, distillation is not necessary for all solvent-containing fluids arising from dry-cleaning. For example, evaporated solvent-water mixtures do not necessarily require distillation since they are substantially "impurity-free" and only require water-solvent separation operations.

Accordingly, the need remains for a cost effective, efficient, and safe separation method for lipophilic fluids and water, particularly when an emulsifier is present.

SUMMARY OF THE INVENTION

The present invention provides methods and systems for safely separating lipophilic fluids and water in a cost effective, efficient, and safe manner.

In a first embodiment, the present invention provides a process for removing water from a lipophilic fluid and water emulsion, said process comprising the step of exposing said emulsion to an absorbent matrix comprising an absorbent material in order to effect the removal of said water from said lipophilic fluid and water emulsion such that the lipophilic fluid is recovered as collected lipophilic fluid.

In a second embodiment, the present invention provides a system for removing water from a lipophilic fluid and water emulsion, said system comprising exposing said emulsion to an absorbent matrix comprising an absorbent material in order to effect the removal of said water from said lipophilic fluid and water emulsion such that the lipophilic fluid is recovered as collected lipophilic fluid.

In a third embodiment, the present invention provides a composition comprising an absorbent material, lipophilic fluid, water, and emulsifier.

These and other aspects, features and advantages will become apparent to those of ordinary skill in the art from the following detailed description and the appended claims. All percentages, ratios and proportions herein are by weight, unless otherwise specified. All temperatures are in degrees Celsius (° C.) unless otherwise specified. All measurements are in SI units unless otherwise specified. All documents cited are, in relevant part, incorporated herein by reference.

DETAILED DESCRIPTION OF THE INVENTION

Definitions

The term "lipophilic fluid" used herein is intended to encompass any non-aqueous fluid or vapor capable of removing sebum, as qualified by the test described below.

The term "fabrics" and "fabric" used herein is intended to mean any article that is customarily cleaned in a water-based laundry process or in a solvent-based dry cleaning process. As such the term encompasses bulk fabrics and fibers, as well as finished articles of clothing, linens, drapery, and clothing accessories. The term also encompasses other items made in whole or in part of fabric, such as tote bags, furniture covers, tarpaulins and the like.

The term "absorbent material" or "absorbent polymer" used herein is intended to mean any material capable of selectively absorbing or adsorbing water and/or water-containing liquids without absorbing lipophilic fluids as described in detail. In the art they may also be referred to as "responsive gels," "gel," and "polymeric gel." For a list of phase changing gels, see the textbook *Responsive Gels, Volume Transitions II*, Ed K. Dusek, Springer Verlag Berlin, 1993 (herein incorporated by reference). See also, *Thermo-responsive Gels*, Radiat. Phys. Chem., Volume 46, No. 2, pp.185–190, Elsevier Science Ltd. Great Britain, 1995 (herein incorporated by reference). Super absorbent polymers, also suitable for use with the present invention, are polymeric materials that have an absorption capacity at or above 5 grams/gram. See also, *Superabsorbent Polymers Science and Technology*, edited by Fredric L. Buchholz and Nicholas A. Peppas, American Chemical Society, Washington D.C., 1994 (particularly Chapter 9 by Tadao Shimomura and Takashi Namba entitled "Preparation and Application of High-Performance Superabsorbent Polymers") herein incorporated by reference.

The term "absorbent matrix permeability aid" or "spacer material" or "spacer" used herein is intended to mean any fibrous or particulate material that is, at most, only slightly soluble in water and/or lipophilic fluid.

The term "absorbent matrix" used herein is intended to mean a matrix in any form that is capable of absorbing or adsorbing water. At minimum, it comprises an absorbent material. It may optionally comprise a spacer material and/or a high surface area material.

Lipophilic Fluid

In general, lipophilic fluid can be fully liquid at ambient temperature and pressure, can be an easily melted solid, e.g., one which becomes liquid at temperatures in the range from about 0 deg. C. to about 60 deg. C., or can comprise a mixture of liquid and vapor phases at ambient temperatures and pressures, e.g., at 25 deg. C. and 1 atm. pressure. Thus, the essential lipophilic fluid is not a compressible gas such as carbon dioxide. It is preferred that the lipophilic fluid herein be nonflammable or have relatively high flash points and/or low VOC characteristics, these terms having their conventional meanings as used in the dry cleaning industry, to equal or, preferably, exceed the characteristics of known conventional dry cleaning fluids.

Suitable lipophilic fluids herein readily flow and are non-viscous. In general, the lipophilic fluids herein are required to be fluids capable of at least partially dissolving sebum (e.g. body soil) as defined in the test hereinafter. Mixtures of lipophilic fluid are also suitable, and provided that the requirements of the test are met, the lipophilic fluid can include any fraction of dry-cleaning solvents, especially newer types including non-fluorinated solvents, or perfluorinated amines. Some perfluorinated amines such as perfluorotributylamines, while unsuitable for use as lipophilic fluid, may be present as one of many possible adjuncts present in the lipophilic fluid. Other suitable lipophilic fluids include diol solvent systems e.g., higher diols such as C6- or C8- or higher diols; organosilicone solvents including both cyclic and acyclic types, and the like; and mixtures thereof.

A preferred group of nonaqueous liquids suitable for incorporation as the major component of the lipophilic fluid includes low-volatility non-fluorinated organics, silicones, especially those other than amino-functional silicones, and mixtures thereof. Low volatility nonfluorinated organics include for example OLEAN® and other polyol esters, or certain relatively nonvolatile biodegradable mid-chain branched petroleum fractions. Suitable silicones for use as a major component, e.g., more than 50%, of the lipophilic fluid include cyclopentasiloxane, sometimes termed "D5", or linear analogs having approximately similar volatility, optionally complemented by other compatible silicones.

Suitable silicones are well known in the literature, see, for example, Kirk Othmer's Encyclopedia of Chemical Technology, and are available from a number of commercial sources, including General Electric, Toshiba Silicone, Bayer, and Dow Corning. Other suitable fluids are commercially available from Procter & Gamble or from Dow Chemical and other suppliers. For example one suitable silicone is SF-1528 available from GE silicone fluids. Notably, SF-1528 fluid is 90% cyclopentasiloxane (D5).

Any non-aqueous fluid that is both capable of meeting known requirements for a dry-cleaning fluid (e.g., flash point etc.) and is capable of at least partially dissolving sebum, as indicated by the test method described below, is suitable as a lipophilic fluid herein. The ability of a particular material to remove sebum can be measured by any known technique. As a general guideline, perfluorobutylamine (Fluorinert FC-43®) on its own (with or without adjuncts) is a reference material that, by definition, is unsuitable as the lipophilic fluid herein (it is essentially a non-solvent) while D5 dissolves sebum.

The following is the method for investigating and qualifying other materials, e.g., other low-viscosity, free-flowing silicones, for use as the lipophilic fluid. The method uses commercially available Crisco® canola oil, oleic acid (95% pure, available from Sigma Aldrich Co.) and squalene (99% pure, available from J. T. Baker) as model soils for sebum. The test materials should be substantially anhydrous and free from any added adjuncts, or other materials during evaluation.

Prepare three vials. Place 1.0 g of canola oil in the first; in a second vial place 1.0 g of the oleic acid (95%), and in a third and final vial place 1.0 g of the squalene (99.9%). To each vial add 1 g of the fluid to be tested for lipophilicity. Separately mix at room temperature and pressure each vial containing the lipophilic soil and the fluid to be tested for 20 seconds on a standard vortex mixer at maximum setting. Place vials on the bench and allow settling for 15 minutes at room temperature and pressure. If, upon standing, a single phase is formed in any of the vials containing lipophilic soils, then the fluid qualifies as suitable for use as a "lipophilic fluid" in accordance with the invention. However, if two or more separate layers are formed in all three vials, then the amount of fluid dissolved in the test fluid will need to be further determined before rejecting or accepting the fluid as qualified.

In such a case, with a syringe, carefully extract a 200 microliter sample from each layer in each vial. The syringe-extracted layer samples are placed in GC autosampler vials and subjected to conventional GC analysis after determining the retention time of calibration samples of each of the three models soils and the fluid being tested. If more than 1% of the test fluid by GC, preferably greater, is found to be present in any one of the layers which consists of the oleic acid, canola oil or squalene layer, then the test fluid is also qualified for use as a lipophilic fluid. If needed, the method can be further calibrated using heptacosafluorotributy lamine, i.e., Fluorinert FC-43 (fail) and cyclopentasiloxane (pass).

A suitable GC is a Hewlett Packard Gas Chromatograph HP5890 Series II equipped with a split/splitless injector and FID. A suitable column used in determining the amount of lipophilic fluid present is a J&W Scientific capillary column DB-1HT, 30 meter, 0.25 mm id, 0.1 um film thickness cat# 1221131. The GC is suitably operated under the following conditions:

Carrier Gas: Hydrogen
Column Head Pressure: 9 psi

Flows: Column Flow @ ~1.5 ml/min.
Split Vent @ ~250–500 ml/min.
Septum Purge @ 1 ml/min.
Injection: HP 7673 Autosampler, 10 ul syringe, 1 ul injection
Injector Temperature: 350° C.
Detector Temperature: 380° C.
Oven Temperature Program: initial 60° C., hold 1 min. rate 25° C./min.
final 380° C., hold 30 min.

Preferred lipophilic fluids suitable for use herein can further be qualified for use on the basis of having an excellent garment care profile. Garment care profile testing is well known in the art and involves testing a fluid to be qualified using a wide range of garment or fabric article components, including fabrics, threads and elastics used in seams, etc., and a range of buttons. Preferred lipophilic fluids for use herein have an excellent garment care profile, for example they have a good shrinkage or fabric puckering profile and do not appreciably damage plastic buttons.

For purposes of garment care testing or other qualification, e.g., flammability, a lipophilic fluid can be present in a mixture, e.g., with water, at approximately the ratio to be used in the final lipophilic fluid that will come into contact with fabric articles. Certain materials that remove sebum and which otherwise qualify for use as lipophilic fluids, for example, ethyl lactate can be quite objectionable due to its tendency to dissolve buttons. If such a material is to be used in the lipophilic fluid, it will be formulated with water and/or other solvents such that the overall mix is not substantially damaging to buttons. Other lipophilic fluids, D5 for example, meet the garment care requirements commendably. Some suitable lipophilic fluids may be found in granted U.S. Pat. Nos. 5,865,852; 5,942,007; 6,042,617; 6,042,618; 6,056,789; 6,059,845; and 6,063,135.

Lipophilic solvents can include linear and cyclic polysiloxanes, hydrocarbons and chlorinated hydrocarbons. More preferred are the linear and cyclic polysiloxanes and hydrocarbons of the glycol ether, acetate ester, lactate ester families. Preferred lipophilic solvents include cyclic siloxanes having a boiling point at 760 mm Hg. of below about 250° C. Specifically preferred cyclic siloxanes for use in this invention are octamethylcyclotetrasiloxane, decamethylcyclopentasiloxane, and dodecamethylcyclohexasiloxane. Preferably, the cyclic siloxane comprises decamethylcyclopentasiloxane (D5, pentamer) and is substantially free of octamethylcyclotetrasiloxane (tetramer) and dodecamethylcyclohexasiloxane (hexamer).

However, it should be understood that useful cyclic siloxane mixtures might contain, in addition to the preferred cyclic siloxanes, minor amounts of other cyclic siloxanes including octamethylcyclotetrasiloxane and hexamethylcyclotrisiloxane or higher cyclics such as tetradecamethylcycloheptasiloxane. Generally the amount of these other cyclic siloxanes in useful cyclic siloxane mixtures will be less than about 10 percent based on the total weight of the mixture. The industry standard for cyclic siloxane mixtures is that such mixtures comprise less than about 1% by weight of the mixture of octamethylcyclotetrasiloxane.

Accordingly, the lipophilic fluid of the present invention preferably comprises more than about 50%, more preferably more than about 75%, even more preferably at least about 90%, most preferably at least about 95% by weight of the lipophilic fluid of decamethylcyclopentasiloxane. Alternatively, the lipophilic fluid may comprise siloxanes which are a mixture of cyclic siloxanes having more than about 50%, preferably more than about 75%, more preferably at least about 90%, most preferably at least about 95% up to about 100%, preferably 100% by weight of the mixture of decamethylcyclopentasiloxane and less than about 10%, preferably less than about 5%, more preferably less than about 2%, even more preferably less than about 1%, most preferably less than about 0.5% to about 0% by weight of the mixture of octamethylcyclotetrasiloxane and/or dodecamethylcyclohexasiloxane.

Adjunct Ingredients

Adjunct materials can vary widely and can be used at widely ranging levels. For example, detersive enzymes such as proteases, amylases, cellulases, lipases and the like as well as bleach catalysts including the macrocyclic types having manganese or similar transition metals all useful in laundry and cleaning products can be used herein at typical or atypical levels. Adjunct materials that are catalytic, for example enzymes, can be used in "forward" or "reverse" modes, a discovery independently useful from the present invention. For example, a lipolase or other hydrolase may be used, optionally in the presence of alcohols as adjuncts, to convert fatty acids to esters, thereby increasing their solubility in the lipophilic fluid. This is a "reverse" operation, in contrast with the normal use of this hydrolase in water to convert a less water-soluble fatty ester to a more water-soluble material. In any event, any adjunct ingredient must be suitable for use in combination with the lipophilic fluid.

The compositions may comprise emulsifiers. Emulsifiers are well known in the chemical art. Essentially, an emulsifier acts to bring two or more insoluble or semi-soluble phases together to create a stable or semi-stable emulsion. It is preferred in the claimed invention that the emulsifier serves a dual purpose wherein it is capable of acting not only as an emulsifier but also as a treatment performance booster. For example, the emulsifier may also act as a surfactant thereby boosting cleaning performance. Both ordinary emulsifiers and emulsifier/surfactants are commercially available.

Some suitable cleaning additives include, but are not limited to, builders, surfactants, enzymes, bleach activators, bleach catalysts, bleach boosters, bleaches, alkalinity sources, antibacterial agents, colorants, perfumes, pro-perfumes, finishing aids, lime soap dispersants, composition malodor control agents, odor neutralizers, polymeric dye transfer inhibiting agents, crystal growth inhibitors, photobleaches, heavy metal ion sequestrants, anti-tarnishing agents, anti-microbial agents, anti-oxidants, anti-redeposition agents, electrolytes, pH modifiers, thickeners, abrasives, divalent or trivalent ions, metal ion salts, enzyme stabilizers, corrosion inhibitors, diamines or polyamines and/or their alkoxylates, suds stabilizing polymers, solvents, process aids, fabric softening agents, optical brighteners, hydrotropes, suds or foam suppressors, suds or foam boosters, fabric softeners, antistatic agents, dye fixatives, dye abrasion inhibitors, anti-crocking agents, wrinkle reduction agents, wrinkle resistance agents, soil release polymers, soil repellency agents, sunscreen agents, anti-fade agents, and mixtures thereof.

The term "surfactant" conventionally refers to materials that are surface-active either in the water, the lipophilic fluid, or the mixture of the two. Some illustrative surfactants include nonionic, cationic and silicone surfactants as used in conventional aqueous detergent systems. Suitable nonionic surfactants include, but are not limited to:
   a) Polyethylene oxide condensates of nonyl phenol and myristyl alcohol, such as in U.S. Pat. No. 4,685,930 Kasprzak; and
   b) fatty alcohol ethoxylates, R—(OCH$_2$CH$_2$)$_a$OH a=1 to 100, typically 12–40, R=hydrocarbon residue 8 to 20 C atoms, typically linear alkyl. Examples polyoxyethylene lauryl ether, with 4 or 23 oxyethylene groups; polyoxyethylene cetyl ether with 2, 10 or 20 oxyethylene groups; polyoxyethylene stearyl ether, with 2, 10, 20, 21 or 100 oxyethylene groups; polyoxyethylene (2), (10) oleyl ether, with 2 or 10 oxyethylene groups. Commercially available examples include, but are not limited to: ALFONIC, BRIJ, GENAPOL, NEODOL, SURFONIC, TRYCOL. See also U.S. Pat. No. 6,013,683 Hill et al.,.

Suitable cationic surfactants include, but are not limited to, dialkyldimethylammonium salts having the formula:

$$R'R''N^+(CH_3)_2X^-$$

Where each R'R" is independently selected from the group consisting of 12–30 C atoms or derived from tallow, coconut oil or soy, X=Cl or Br, Examples include: didodecyldimethylammonium bromide (DDAB), dihexadecyldimethyl ammonium chloride, dihexadecyldimethyl ammonium bromide, dioctadecyldimethyl ammonium chloride, dihexadecyldimethyl ammonium chloride, didocosyldimethyl ammonium chloride, dicoconutdimethyl ammonium chloride, ditallowdimethyl ammonium bromide (DTAB). Commercially available examples include, but are not limited to: ADOGEN, ARQUAD, TOMAH, VARIQUAT. See also U.S. Pat. No. 6,013,683 Hill et al.,.

Suitable silicone surfactants include, but are not limited to the polyalkyleneoxide polysiloxanes having a dimethyl polysiloxane hydrophobic moiety and one or more hydrophilic polyalkylene side chains and have the general formula:

$$R^1-(CH_3)_2SiO-[(CH_3)_2SiO]_a-[(CH_3)(R^1)SiO]_b-Si(CH_3)_2-R^1$$

wherein a+b are from about 1 to about 50, preferably from about 3 to about 30, more preferably from about 10 to about 25, and each $R^1$ is the same or different and is selected from the group consisting of methyl and a poly(ethyleneoxide/propyleneoxide) copolymer group having the general formula:

$$-(CH_2)_nO(C_2H_4O)_c(C_3H_6O)_dR^2$$

with at least one $R^1$ being a poly(ethyleneoxide/propyleneoxide) copolymer group, and wherein n is 3 or 4, preferably 3; total c (for all polyalkyleneoxy side groups) has a value of from 1 to about 100, preferably from about 6 to about 100; total d is from 0 to about 14, preferably from 0 to about 3; and more preferably d is 0; total c+d has a value of from about 5 to about 150, preferably from about 9 to about 100 and each $R^2$ is the same or different and is selected from the group consisting of hydrogen, an alkyl having 1 to 4 carbon atoms, and an acetyl group, preferably hydrogen and methyl group. Examples of these surfactants may be found in U.S. Pat. No. 's 5,705,562 and 5,707,613, both to Hill.

Examples of this type of surfactants are the Silwet® surfactants available from CK Witco, OSi Division, Danbury, Conn. Representative Silwet surfactants are as follows.

| Name | Average MW | Average a + b | Average total c |
| --- | --- | --- | --- |
| L-7608 | 600 | 1 | 9 |
| L-7607 | 1,000 | 2 | 17 |
| L-77 | 600 | 1 | 9 |

-continued

| Name | Average MW | Average a + b | Average total c |
| --- | --- | --- | --- |
| L-7605 | 6,000 | 20 | 99 |
| L-7604 | 4,000 | 21 | 53 |
| L-7600 | 4,000 | 11 | 68 |
| L-7657 | 5,000 | 20 | 76 |
| L-7602 | 3,000 | 20 | 29 |

The molecular weight of the polyalkyleneoxy group ($R^1$) is less than or equal to about 10,000. Preferably, the molecular weight of the polyalkyleneoxy group is less than or equal to about 8,000, and most preferably ranges from about 300 to about 5,000. Thus, the values of c and d can be those numbers that provide molecular weights within these ranges. However, the number of ethyleneoxy units ($-C_2H_4O$) in the polyether chain ($R^1$) must be sufficient to render the polyalkyleneoxide polysiloxane water dispersible or water soluble. If propyleneoxy groups are present in the polyalkylenoxy chain, they can be distributed randomly in the chain or exist as blocks. Preferred Silwet surfactants are L-7600, L-7602, L-7604, L-7605, L-7657, and mixtures thereof. Besides surface activity, polyalkyleneoxide polysiloxane surfactants can also provide other benefits, such as antistatic benefits, and softness to fabrics.

The preparation of polyalkyleneoxide polysiloxanes is well known in the art. Polyalkyleneoxide polysiloxanes of the present invention can be prepared according to the procedure set forth in U.S. Pat. No. 3,299,112. Another suitable silicone surfactant is SF-1488, which is commercially available from GE silicone fluids.

These and other surfactants suitable for use in combination with the lipophilic fluid as adjuncts are well known in the art, being described in more detail in Kirk Othmer's Encyclopedia of Chemical Technology, 3rd Ed., Vol. 22, pp. 360–379, "Surfactants and Detersive Systems." Further suitable nonionic detergent surfactants are generally disclosed in U.S. Pat. No. 3,929,678, Laughlin et al., issued Dec. 30, 1975, at column 13, line 14 through column 16, line 6.

The adjunct may also be an antistatic agent. Any suitable well-known antistatic agents used in laundering and dry cleaning art are suitable for use in the methods and compositions of the present invention. Especially suitable as antistatic agents are the subset of fabric softeners which are known to provide antistatic benefits. For example those fabric softeners that have a fatty acyl group which has an iodine value of above 20, such as N,N-di(tallowoyl-oxyethyl)-N,N-dimethyl ammonium methylsulfate. However, it is to be understood that the term "antistatic agent" is not to be limited only to this subset of fabric softeners and includes all antistatic agents.

Although the methods and/or compositions utilized in present invention will be described in detail, it should be understood, and one skilled in the art will recognize, that any compositions, processes, and/or apparati capable of carrying out the invention could be used.

Absorbent Materials

Hydrogel-Forming Absorbent Polymers

The absorbent polymers of the present invention preferably comprise at least one hydrogel-forming absorbent polymer (also referred to as hydrogel-forming polymer). Hydrogel-forming polymers useful in the present invention include a variety of water-insoluble, but water-swellable polymers capable of absorbing aqueous liquids. Such hydrogel-forming polymers are well known in the art and any of these polymers are useful in the present invention.

Hydrogel-forming absorbent polymers are also commonly referred to as "hydrocolloids," or "absorbent" materials and can include polysaccharides such as carboxymethyl starch, carboxymethyl cellulose, and hydroxypropyl cellulose; nonionic types such as polyvinyl alcohol, and polyvinyl ethers; cationic types such as polyvinyl pyridine, polyvinyl morpholinione, and N,N-dimethylaminoethyl or N,N-diethylaminopropyl acrylates and methacrylates, and the respective quaternary salts thereof. Typically, hydrogel-forming absorbent polymers useful in the present invention have a multiplicity of anionic or cationic functional groups such as sulfonic acid or amide or amino groups, and more typically carboxy, groups. Examples of polymers suitable for use herein include those that are prepared from polymerizable, unsaturated, acid-containing monomers. Examples of cationic polymers with cationic groups are prepared from base-containing monomers. Thus, such monomers include the olefinically unsaturated acids and anhydrides that contain at least one carbon-to-carbon olefinic double bond. More specifically, these monomers can be selected from olefinically unsaturated carboxylic acids and acid anhydrides, olefinically unsaturated sulfonic acids, and mixtures thereof. As indicated above, the nature of the hydrogel-forming absorbent polymer is not critical to the present invention; nonetheless, the selection of the optimal polymeric material may enhance the performance characteristics of the present invention. The disclosure that follows describes preferred properties of the absorbent polymers useful herein. These properties should not be interpreted as limitations; rather, they merely indicate the progression that has occurred in the absorbent polymer art over the past several years.

Some non-acid monomers can also be included, usually in minor amounts, in preparing the hydrogel-forming absorbent polymers herein. Such non-acid monomers can include, for example, the water-soluble or water-dispersible esters of the acid-containing monomers, as well as monomers that contain no carboxylic or sulfonic acid groups at all. Optional non-acid monomers can thus include monomers containing the following types of functional groups: carboxylic acid or sulfonic acid esters, hydroxyl groups, amide-groups, amino groups, nitrile groups, quaternary ammonium salt groups, aryl groups (e.g., phenyl groups, such as those derived from styrene monomer). These non-acid monomers are well-known materials and are described in greater detail, for example, in U.S. Pat. No. 4,076,663 (Masuda et al.), issued Feb. 28, 1978, and in U.S. Pat. No. 4,062,817 (Westerman), issued Dec. 13, 1977, both of which are incorporated by reference.

Olefinically unsaturated carboxylic acid and carboxylic acid anhydride monomers include the acrylic acids typified by acrylic acid itself, methacrylic acid, ethacrylic acid, α-chloroacrylic acid, a-cyanoacrylic acid, β-methylacrylic acid (crotonic acid), α-phenylacrylic acid, β-acryloxypropionic acid, sorbic acid, α-chlorosorbic acid, angelic acid, cinnamic acid, p-chlorocinnamic acid, β-sterylacrylic acid, itaconic acid, citroconic acid, mesaconic acid, glutaconic acid, aconitic acid, maleic acid, fumaric acid, tricarboxyethylene and maleic acid anhydride.

Olefinically unsaturated sulfonic acid monomers include aliphatic or aromatic vinyl sulfonic acids such as vinylsulfonic acid, allyl sulfonic acid, vinyl toluene sulfonic acid and styrene sulfonic acid; acrylic and methacrylic sulfonic acid such as sulfoethyl acrylate, sulfoethyl methacrylate, sulfopropyl acrylate, sulfopropyl methacrylate, 2-hydroxy-3-methacryloxypropyl sulfonic acid and 2-acrylamide-2-methylpropane sulfonic acid.

Preferred hydrogel-forming absorbent polymers for use in the present invention contain carboxy groups. These polymers include hydrolyzed starch-acrylonitrile graft copolymers, partially neutralized hydrolyzed starch-acrylonitrile graft copolymers, starch-acrylic acid graft copolymers, partially neutralized starch-acrylic acid graft copolymers, saponified vinyl acetate-acrylic ester copolymers, hydrolyzed acrylonitrile or acrylamide copolymers, slightly network crosslinked polymers of any of the foregoing copolymers, partially neutralized polyacrylic acid, and slightly network crosslinked polymers of partially neutralized polyacrylic acid. These polymers can be used either solely or in the form of a mixture of two or more different polymers. Examples of these polymer materials are disclosed in U.S. Pat. Nos. 3,661,875, 4,076,663, 4,093,776, 4,666,983, and 4,734,478.

Most preferred polymer materials for use in making the hydrogel-forming absorbent polymers are slightly network crosslinked polymers of partially neutralized polyacrylic acids and starch derivatives thereof. Most preferably, the hydrogel-forming absorbent polymers comprise from about 50 to about 95%, preferably about 75%, neutralized, slightly network crosslinked, polyacrylic acid (i.e., poly (sodium acrylate/acrylic acid)). Network crosslinking renders the polymer substantially water-insoluble and, in part, determines the absorptive capacity and extractable polymer content characteristics of the hydrogel-forming absorbent polymers. Processes for network crosslinking these polymers and typical network crosslinking agents are described in greater detail in U.S. Pat. No. 4,076,663.

While the hydrogel-forming absorbent polymer is preferably of one type (i.e., homogeneous), mixtures of polymers can also be used in the present invention. For example, mixtures of starch-acrylic acid graft copolymers and slightly network crosslinked polymers of partially neutralized polyacrylic acid can be used in the present invention.

The hydrogel-forming polymer component may also be in the form of a mixed-bed ion-exchange composition comprising a cation-exchange hydrogel-forming absorbent polymer and an anion-exchange hydrogel-forming absorbent polymer. Such mixed-bed ion-exchange compositions are described in, e.g., U.S. patent application Ser. No. 09/130, 321, filed Jan. 7, 1998 by Ashraf, et al. (P&G Case 6976R— titled "ABSORBENT POLYMER COMPOSITIONS WITH HIGH SORPTION CAPACITY AND HIGH FLUID PERMEABILITY UNDER AN APPLIED PRESSURE"); and U.S. Pat. No. 6,121,509; the disclosure of each of which is incorporated herein by reference.

The hydrogel-forming absorbent polymers useful in the present invention can have a size, shape and/or morphology varying over a wide range. These polymers can be in the form of particles that do not have a large ratio of greatest dimension to smallest dimension (e.g., granules, pulverulents, interparticle aggregates, interparticle crosslinked aggregates, and the like) and can be in the form of fibers, sheets, films, foams, flakes and the like. The hydrogel-forming absorbent polymers can also comprise mixtures with low levels of one or more additives, such as for example powdered silica, zeolites, activated carbon, molecular sieves, surfactants, glue, binders, and the like. The components in this mixture can be physically and/or chemically associated in a form such that the hydrogel-forming polymer component and the non-hydrogel-forming polymer additive are not readily physically separable.

The hydrogel-forming absorbent polymers can be essentially non-porous (i.e., no internal porosity) or have substantial internal porosity.

For particles as described above, particle size is defined as the dimension determined by sieve size analysis. Thus, for example, a particle that is retained on a U.S.A. Standard Testing Sieve with 710 micron openings (e.g., No. 25 U.S. Series Alternate Sieve Designation) is considered to have a size greater than 710 microns; a particle that passes through a sieve with 710 micron openings and is retained on a sieve with 500 micron openings (e.g., No. 35 U.S., Series Alternate Sieve Designation) is considered to have a particle size between 500 and 710 $\mu$m; and a particle that passes through a sieve with 500 micron openings is considered to have a size less than 500 $\mu$m. The mass median particle size of a given sample of hydrogel-forming absorbent polymer particles is defined as the particle size that divides the sample in half on a mass basis, i.e., one-half of the sample by weight will have a particle size less than the mass median size and one-half of the sample will have a particle size greater than the mass median size. A standard particle-size plotting method (wherein the cumulative weight percent of the particle sample retained on or passed through a given sieve size opening is plotted versus sieve size opening on probability paper) is typically used to determine mass median particle size when the 50% mass value does not correspond to the size opening of a U.S.A. Standard Testing Sieve. These methods for determining particle sizes of the hydrogel-forming absorbent polymer particles are further described in U.S. Pat. No. 5,061,259 (Goldman et al.), issued Oct. 29, 1991, which is incorporated by reference.

For particles of hydrogel-forming absorbent polymers useful in the present invention, the particles will generally range in size from about 1 to about 2000 $\mu$m, more preferably from about 20 to about 1000 $\mu$m. The mass median particle size will generally be from about 20 to about 1500 $\mu$m, more preferably from about 50 $\mu$m to about 1000 $\mu$m, and even more preferably from about 100 to about 800 $\mu$m. For embodiments containing films, membranes, foam, fibers, or polymers coated on a substrate like a nonwoven, particles larger than the ones described above may be useful or even preferred.

In specific embodiments, other properties of the absorbent polymer may also be relevant. In such embodiments, the materials may have one or more of the properties described by U.S. Pat. No. 5,562,646, issued Oct. 8, 1996 to Goldman et al. and U.S. Pat. No. 5,599,335, issued Feb. 4, 1997 to Goldman et al., the disclosure of each of which is incorporated by reference herein.

The basic hydrogel-forming absorbent polymer can be formed in any conventional manner. Typical and preferred processes for producing these polymers are described in U.S. Reissue Pat. No. 32,649 (Brandt et al.), issued Apr. 19, 1988, U.S. Pat No. 4,666,983 (Tsubakimoto et al.), issued May 19, 1987, and U.S. Pat. No. 4,625,001 (Tsubakimoto et al.), issued Nov. 25, 1986, all of which are incorporated by reference.

Preferred methods for forming the basic hydrogel-forming absorbent polymer are those involving aqueous solution or other solution polymerization methods. As described in the above-referenced U.S. Pat No. Reissue 32,649, aqueous solution polymerization involves the use of an aqueous reaction mixture to carry out polymerization. The aqueous reaction mixture is then subjected to polymerization conditions that are sufficient to produce in the mixture, substantially water-insoluble, slightly network crosslinked polymer. The mass of polymer formed can then be pulverized or chopped to form individual particles.

More specifically, the aqueous solution polymerization method for producing the hydrogel-forming absorbent polymer comprises the preparation of an aqueous reaction mixture in which to carry out the polymerization. One element of such a reaction mixture is the acid group-containing monomer that will form the "backbone" of the hydrogel-forming absorbent polymer to be produced. The reaction mixture will generally comprise about 100 parts by weight of the monomer. Another component of the aqueous reaction mixture comprises a network crosslinking agent. Network crosslinking agents useful in forming the hydrogel-forming absorbent polymer according to the present invention are described in more detail in the above-referenced U.S. Reissue Pat. No. 32,649, U.S. Pat. Nos. 4,666,983, and 4,625,001. The network crosslinking agent will generally be present in the aqueous reaction mixture in an amount of from about 0.001 mole percent to about 5 mole percent based on the total moles of monomer present in the aqueous mixture (about 0.01 to about 20 parts by weight, based on 100 parts by weight of the monomer). An optional component of the aqueous reaction mixture comprises a free radical initiator including, for example, peroxygen compounds such as sodium, potassium, and ammonium persulfates, caprylyl peroxide, benzoyl peroxide, hydrogen peroxide, cumene hydroperoxides, tertiary butyl diperphthalate, tertiary butyl perbenzoate, sodium peracetate, sodium percarbonate, and the like. Other optional components of the aqueous reaction mixture comprise the various non-acidic co-monomers, including esters of the essential unsaturated acidic functional group-containing monomers or other co-monomers containing no carboxylic or sulfonic acid functionalities.

The aqueous reaction mixture is subjected to polymerization conditions that are sufficient to produce in the mixture substantially water-insoluble, but water-swellable, hydrogel-forming absorbent slightly network crosslinked polymers. The polymerization conditions are also discussed in more detail in the three above-referenced patents. Such polymerization conditions generally involve heating (thermal activation techniques) to a polymerization temperature from about 0° to about 100° C., more preferably from about 5° to about 40° C. Polymerization conditions under which the aqueous reaction mixture is maintained can also include, for example, subjecting the reaction mixture, or portions thereof, to any conventional form of polymerization activating irradiation. Radioactive, electronic, ultraviolet, and electromagnetic radiation are alternative conventional polymerization techniques.

The acid functional groups of the hydrogel-forming absorbent polymer formed in the aqueous reaction mixture are also preferably neutralized. Neutralization can be carried out in any conventional manner that results in at least about 25 mole percent, and more preferably at least about 50 mole percent, of the total monomer utilized to form the polymer being acid group-containing monomers that are neutralized with a salt-forming cation. Such salt-forming cations include, for example, alkali metals, ammonium, substituted ammonium and amines as discussed in further detail in the above-references U.S. Reissue Pat. No. 32,649.

While it is preferred that the particulate versions of hydrogel-forming absorbent polymer be manufactured using an aqueous solution polymerization process, it is also possible to carry out the polymerization process using multi-phase polymerization processing techniques such as inverse emulsion polymerization or inverse suspension polymerization procedures. In the inverse emulsion polymerization or inverse suspension polymerization procedures, the aqueous reaction mixture as described before is suspended in the form of tiny droplets in a matrix of a water-immiscible, inert organic solvent such as cyclohexane. The resultant particles of hydrogel-forming absorbent polymer are generally spherical in shape. Inverse suspension polymerization procedures are described in greater detail in U.S. Pat. No. 4,340,706 (Obaysashi et al.), issued Jul. 20, 1982, U.S. Pat. No. 4,506,052 (Flesher et al.), issued Mar. 19, 1985, and U.S. Pat. No. 4,735,987 (Morita et al.), issued Apr. 5, 1988, all of which are incorporated by reference.

Surface crosslinking of the initially formed polymers is a preferred process for obtaining hydrogel-forming absorbent polymers having relatively high porosity hydrogel-layer ("PHL"), performance under pressure ("PUP") capacity and saline flow conductivity ("SFC") values, which may be beneficial in the context of the present invention. Suitable general methods for carrying out surface crosslinking of hydrogel-forming absorbent polymers according to the present invention are disclosed in U.S. Pat. No. 4,541,871 (Obayashi), issued Sep. 17, 1985; published PCT application WO92/16565 (Stanley), published Oct. 1, 1992, published PCT application WO90/08789 (Tai), published Aug. 9, 1990; published PCT application WO93/05080 (Stanley), published Mar. 18, 1993; U.S. Pat. No. 4,824,901 (Alexander), issued Apr. 25, 1989; U.S. Pat. No. 4,789,861 (Johnson), issued Jan. 17, 1989; U.S. Pat. No. 4,587,308 (Makita), issued May 6, 1986; U.S. Pat. No. 4,734,478 (Tsubakimoto), issued Mar. 29, 1988; U.S. Pat. No. 5,164,459 (Kimura et al.), issued Nov. 17, 1992; published German patent application 4,020,780 (Dahmen), published Aug. 29, 1991; and published European patent application 509,708 (Gartner), published Oct. 21, 1992; all of which are incorporated by reference. See also, U.S. Pat. No. 5,562,646 (Goldman et al.), issued Oct. 8, 1996 and U.S. Pat. No. 5,599,335 (Goldman et al.), issued Feb. 4, 1997, herein incorporated by reference.

For some embodiments of the present invention, it is advantageous if the hydrogel-forming absorbent polymer particles prepared according to the present invention are typically substantially dry. The term "substantially dry" is used herein to mean that the particles have a liquid content, typically water or other solution content, less than about 50%, preferably less than about 20%, more preferably less than about 10%, by weight of the particles. In general, the liquid content of the hydrogel-forming absorbent polymer particles is in the range of from about 0.01% to about 5% by weight of the particles. The individual particles can be dried by any conventional method such as by heating. Alternatively, when the particles are formed using an aqueous reaction mixture, water can be removed from the reaction mixture by azeotropic distillation. The polymer-containing aqueous reaction mixture can also be treated with a dewatering solvent such as methanol. Combinations of these drying procedures can also be used. The dewatered mass of polymer can then be chopped or pulverized to form substantially dry particles of the hydrogel-forming absorbent polymer.

Other Gelling Polymers

Gels based on acrylamide are also suitable for use in the present invention. Specifically suitable are acrylamide, 2-(acryloyloxyl)ethyl acid phosphate, 2-acyrlamido-2-methylpropanesulfonic acid, 2-dimethylaminoethyl acrylate, 2,2'-bis(acrylamido)acetic acid, 3-(methacrylamido)propyltrimethylammonium chloride, acrylamidomethylpropanedimethylammonium chloride, acrylate, acrylonitrile, acrylic acid, diallyldimethylammonium chloride, diallylammonium chloride, dimethylaminoethyl acrylate, dimethylaminoethyl methacrylate, ethylene glycol, dimethacrylate, ethylene glycol monomethacrylate, methacrylamide, methylacrylamidopropyltrimethylarnmonium chloride, N,N-dimethylacrylamide, N-[2[[5-(dimethylamino)1-naphthaleny]sulfonyl]amino[ethyl]-2-acrylamide, N-[3-dimehtylamino)propyl]acrylamide hydrochloride, N-[3-(dimethylamino)propyl) methacrylamide hydrochloride, poly (diallyldimethylammonium chloride), sodium 2-(2-carboxybenzoyloxy)ethyl methacrylate, sodium acrylate, sodium allyl acetate, sodium methacrylate, sodium styrene sulfonate, sodium vinylacetate, triallylamine, trimethyl(N-acryloyl-3-aminopropyl)ammonium chloride, triphenylmethane-leuco derivatives, vinyl-terminated polymethylsiloxane, N-(2-ethoxyethyl)acrylamide, N-3-(methoxypropyl)acrylamide, N-(3-ethoxyptopyl) acrylamide, N-cyclopropylacrylamide, N-n-propylacrylamide, and N-(tetrahydrofurfuryl)acrylamide.

Also suitable are the gels based on N-isopropylacrylamide. These can include N-isopropylacrylamide, 2-(diethylamino)ethyl methacrylate, 2-(dimethylamino)ethyl methacrylate, 2-acrylamido-2-methyl-1-propanesulfonacrylate, acrylic acid, acrylamide alkyl methacrylate, bis(4-dimethylamino)phenyl)(4-vinylphenyl)methyl leucocyanide, Concanavalin A (Lecithin), hexyl methacrylate, lauryl methacrylate, methacrylic acid, methacrylamidopropyltrimethylammonium chloride, n-butyl methacrylate, poly(tetrafluoroethylene), polytetramethylene ether glycol, sodium acrylate, sodium methacrylate, sodium vinyl sulfonate, and vinyl-terminated polymethylsiloxane.

Also suitable are the gels based on N,N'-diethylacrylamide. These can include N,N'-diethylacrylamide, methyacrylamidopropyltrimethylammonium chloride, N-acryloxysuccinimide ester, N-tert-butylacrylamide, and sodium methacrylate.

Gels based on acrylate are also suitable. These may include 2-dimethylaminoethyl acrylate, 2-acrylamido-2-methylpropanesulfonic acid, acrylamide, triallylamine, acrylate, acrylamide, methyl methacrylate, divinylbenzene, N,N-dimehtylaminoethyl methacrylate, poly (oxytetramethylene dimethacrylate), poly(2-hydroxyethyl methacrylate), poly(2-hydroxypropyl methacrylate), and polyethylene glycol methacrylate.

Also suitable are the gels based on various monomers. These can include acrylic acid, methacrylamidopropyltrimethylammonium chloride, Collagen, dipalmitoylphosphatidylethanolamine, poly[4-6-decadiene-1,10-diolbis(n-butoxycarbonylmethyl urethane)], poly[bis [aminoethoxy)ethoxy]phosphazene], poly[bis [(butoxyethoxy)ethoxy]phosphazene], poly[bis [ethoxyethoxy)ethoxy]phosphazene], poly[bis [methoxyethoxy)ethoxy]phosphazene], poly[bis [methoxyethoxy]phosphazene], polydimethylsiloxane, polyethylene oxide, poly(ethylene-dimethylsiloxane-ethylene oxide), poly(N-acrylopyrrolidine), poly[n,n-dimethyl-N-[(methacryloyloxyethyl]-N-(3-sulfopropyl) ammonium betaine], polymethacrylic acid, polymethacryloyl dipeptide, polyvinyl alcohol, polyvinyl alcohol-vinyl acetate, polyvinyl methyl ether, furan-modified poly(n-acetylethylene imine), and malein imide-modified poly(n-acetylethylene imine).

Also suitable are the gels disclosed in U.S. Pat. Nos. 4,555,344, 4,828,710, and European Application EP 648,521 A2 (all of which are herein incorporated by reference).

High Surface Area Materials

In addition to the osmotic absorbent (for example, hydrogel-forming absorbent polymers), the present invention can comprise a high surface area material. It is this high surface area material that provides, either itself or in combination with the hydrogel-forming absorbent polymer, the separation apparatus or vessel with high capillary sorption absorbent capacity. As discussed herein, high surface area materials are described, in one regard, in terms of their capillary sorption absorbent capacity (measured without hydrogel-forming polymer or any other optional material contained in the separation apparatus or vessel). It is recognized that materials having high surface areas may have uptake capacities at very high suction heights (e.g., 100 cm or higher). This allows the high surface area materials to provide one or both of the following functions: i) a capillary pathway of liquid to the osmotic absorbents, and/or ii) additional absorbent capacity. Thus, while the high surface area materials may be described in terms of their surface area per weight or volume, applicants herein alternatively use capillary sorption absorbent capacity to describe the high surface area material because capillary sorption absorbent capacity is a performance parameter that generally will provide the separation apparatus or vessel used in the present invention with the requisite suction capabilities to provide improved absorbent articles. It will be recognized that certain high surface area materials, e.g. glass microfibers, will themselves not exhibit particularly high capillary sorption absorbent capacity at all heights, especially very high heights (e.g., 100 cm and higher). Nonetheless, such materials may provide the desired capillary pathway of liquid to the hydrogel-forming absorbent polymer or other osmotic absorbent to provide the requisite capillary sorption absorbent capacities, even at relatively high heights, when combined with the hydrogel-forming polymer or other osmotic absorbent.

Any material having sufficient capillary sorption absorbent capacity when used in combination with the hydrogel-forming absorbent polymer or other osmotic absorbent will be useful in the separation apparatus or vessel of the present invention. In this regard, the term "high surface area material" refers to any material that itself (i.e., as measured without the osmotic absorbent or any other optional material that is contained in the separation apparatus or vessel) exhibits one or more of the following capillary sorption absorbent capacities: (I) A capillary sorption absorbent capacity of at least about 2 g/g at a suction height of 100 cm, preferably at least about 3 g/g, still more preferably at least about 4 g/g, and still more preferably at least about 6 g/g, at a height of 100 cm; (II) A capillary sorption absorbent capacity at a height of 35 cm of at least about 5 g/g, preferably at least about 8 g/g, more preferably at least about 12 g/g; (III) A capillary sorption absorbent capacity at a height of 50 cm of at least about 4 g/g, preferably at least about 7 g/g, more preferably at least about 9 g/g; (IV) A capillary sorption absorbent capacity at a height of 140 cm of at least about 1 g/g, preferably at least about 2 g/g, more preferably at least about 3 g/g, still more preferably at least about 5 g/g; or (V) A capillary sorption absorbent capacity at a height of 200 cm of at least about 1 g/g, preferably at least about 2 g/g, more preferably at least about 3 g/g, still more preferably at least about 5 g/g.

In one embodiment, the high surface area material will be fibrous (hereafter referred to as "high surface area fibers") in character, so as to provide a fibrous web or fibrous matrix when combined with the hydrogel-forming absorbent polymer or other osmotic absorbent. Alternatively, the high surface area material will be an open-celled, hydrophilic polymeric foam (hereafter referred to as "high surface area polymeric foams" or more generally as "polymeric foams"). These materials are described in detail below.

High surface area fibers useful in the present invention include those that are naturally occurring (modified or unmodified), as well as synthetically made fibers. The high surface area fibers have surface areas much greater than fibers typically used in absorbent articles, such as wood pulp fibers. The high surface area fibers used in the present invention will desirably be hydrophilic. As used herein, the term "hydrophilic" describes fibers, or surfaces of fibers, that are wettable by aqueous liquids (e.g., aqueous body liquids) deposited on these fibers. Hydrophilicity and wettability are typically defined in terms of contact angle and the surface tension of the liquids and solids involved. This is discussed in detail in the American Chemical Society publication entitled *Contact Angle, Wettability and Adhesion*, edited by Robert F. Gould (Copyright 1964). A fiber, or surface of a fiber, is said to be wetted by a liquid (i.e., hydrophilic) when either the contact angle between the liquid and the fiber, or its surface, is less than 90 degrees, or when the liquid tends to spread spontaneously across the surface of the fiber, both conditions normally co-existing. Conversely, a fiber or surface is considered to be hydrophobic if the contact angle is greater than 90 degrees and the liquid does not spread spontaneously across the surface of the fiber. The hydrophilic character of the fibers useful herein may be inherent in the fibers, or the fibers may be naturally hydrophobic fibers that are treated to render them hydrophilic. Materials and methods for providing hydrophilic character to naturally hydrophobic fibers are well known.

High surface area fibers useful herein will have capillary suction specific surface areas in the same range as the polymeric foams described below. Typically, however, high surface area fibers are characterized in terms of BET surface area.

High surface area fibers useful herein include glass microfibers such as, for example, glass wool available from Evanite Fiber Corp. (Corvallis, Oreg.). Glass microfibers useful herein will typically have fiber diameters of not more than about 0.8 $\mu$m, more typically from about 0.1 $\mu$m to about 0.7 $\mu$m. These microfibers will have surface areas of at least about 2 m$^2$/g, preferably at least about 3 m$^2$/g. Typically, the surface area of glass microfibers will be from about 2 m$^2$/g to about 15 m$^2$/g. Representative glass microfibers for use herein are those available from Evanite Fiber Corp. as type 104 glass fibers, which have a nominal fiber diameter of about 0.5 $\mu$m. These glass microfibers have a calculated surface area of about 3.1 m$^2$/g.

Another type of high surface area fibers useful herein are fibrillated cellulose acetate fibers. These fibers (referred to herein as "fibrets") have high surface areas relative to cellulose-derived fibers commonly employed in the absorbent article art. Such fibrets have regions of very small diameters, such that their particle size width is typically from about 0.5 to about 5 $\mu$m. These fibrets typically have a surface area of about 20 m$^2$/g. Representative fibrets useful as the high surface area materials herein are available from Hoechst Celanese Corp. (Charlotte, N.C.) as cellulose acetate Fibrets®. For a detailed discussion of fibrets, including their physical properties and methods for their preparation, see "Cellulose Acetate Fibrets: A Fibrillated Pulp With High Surface Area", Smith, J. E., *Tappi Journal*, December 1988, p. 237; and U.S. Pat. No. 5,486,410 (Groeger et al.) issued Jan. 23, 1996; the disclosure of each of which is incorporated by reference herein.

In addition to these fibers, the skilled artisan will recognize that other fibers well known in the absorbency art may be modified to provide high surface area fibers for use herein. Representative fibers that may be modified to achieve high surface areas required by the present invention are disclosed in U.S. Pat No. 5,599,335, supra (see especially columns 21–24), incorporated herein by reference.

Regardless of the nature of the high surface area fibers utilized, the fibers and the osmotic absorbent will be discrete materials prior to combination. As used herein, the term "discrete" means that the high surface area fibers and the osmotic absorbents are each formed prior to being combined to form the core of the separation apparatus or vessel. In other words, the high surface area fibers are not formed subsequent to mixing with the osmotic absorbent (e.g., hydrogel-forming absorbent polymer), nor is the osmotic absorbent formed after combination with the high surface area fibers. Combining of the discrete respective components ensures that the high surface area fibers will have the desired morphology and, more importantly, the desired surface area.

Spacers

The spacer materials suitable for use in the present invention include any fibrous or particulate material that is, at most, only slightly soluble in water and/or lipophilic fluid. The spacer can be dispersed throughout a matrix of absorbent material in order to improve its permeability above that of a matrix made up of an absorbent material alone; or, the spacer can be used to maintain permeability even after the absorbent material swells and/or gels upon exposure to water. Therefore, the spacer helps reduce the pressure drop across an absorbent material matrix when a water-bearing fluid is passed through the matrix. In addition, if the absorbent material is prone to congealing after exposure to water and subsequent collapse, the spacer can aid in the reduction or prevention of gel congealing upon collapse.

Non-limiting examples of suitable spacer materials include sand, silica, aluminosilicates, glass microspheres, clay, layered silicates, wood, natural textile materials, synthetic textile materials, alumina, aluminum oxide, aluminum silicate, zinc oxide, molecular sieves, zeolites, activated carbon, diatomaceous earth, hydrated silica, mica, microcrystalline cellulose, montmorillonite, peach pit powder, pecan shell powder, talc, tin oxide, titanium dioxide, walnut shell powder, and particles of different metals or metal alloys. Also useful are particles made from mixed polymers (e.g., copolymers, terpolymers, etc.), such as polyethylene/polypropylene copolymer, polyethylene/propylene/isobutylene copolymer, polyethylene/styrene copolymer, and the like.

Other particulate materials useful herein are the synthetic polymeric particles selected from the group consisting of polybutylene, polyethylene, polyisobutylene, polymethylstyrene, polypropylene, polystyrene, polyurethane, nylon, polytetrafluoroethylene, and mixtures thereof. Of these, the most preferred are polyethylene and polypropylene particles, with the oxidized versions of these materials being especially preferred. Examples of commercially available particles useful herein include the ACumist™ micronized polyethylene waxes available from Allied Signal (Morristown, N.J.) available as the A, B, C, and D series in a variety of average particle sizes ranging from 5 microns to 60 microns. Preferred are the ACumist™ A-25, A-30, and A-45 oxidized polyethylene particles having a means particle size of 25, 30, and 45 microns, respectively. Examples of commercially available polypropylene particles include the Propyltex series available from Micro Powders (Dartek) and ACuscrub™ 51, availabie from Allied Signal (Morristown, N.J.) having a mean particle size of about 125 microns.

Absorbent Matrix

In order to increase the "dry" absorbent matrix permeability or maintain the permeability of the absorbent matrix when it is wet, it is important to provide an sufficient absorbent material to spacer, and, optionally, high surface area material ratio. Since the weight of possible spacers can vary greatly with respect to the weight of the absorbent material, the proportion must be quantified on a "dry" volumetric basis. "Net matrix volume" is the volume of the absorbent materials, spacers, and, optionally, any high surface area materials not including any inter-material volume the materials themselves may contain or any volume attributable to intra-material void spaces. "Intra-material void volume" is the cumulative volume of voids between material particles and/or fibers that typically and naturally occurs when particles and/or fibers occupy a given space. "Dry bulk matrix volume" is equal to the net matrix volume combined with the intra-material void volume on a dry basis. With respect to the present invention, it is preferred that the absorbent material is from 50 to 100%, more preferably from 75 to 95%, of the dry bulk matrix volume. It is preferred that the spacer is from 1 to 50%, more preferably from 5 to 25%, of the dry bulk matrix volume. It is preferred that the optional high surface area material be from 1 to 50%, more preferably from 5 to 25%, of the dry bulk matrix volume.

The gel materials, spacers, and, optionally, the high surface area materials can be formed into sheets or films or membranes and configured in different ways. The sheet configuration is application-dependent and generally includes four generic configurations, namely, tubes, hollow fibers, plate and frame units, and spiral wound modules, all of which are within the scope of the present invention.

Tubes are, perhaps, the simplest configuration, in which the sheet is cast on the inside wall of a porous support tube. The tube configuration, however, can be cost-prohibitive with the porous support tube itself being the dominant cost factor.

Hollow fibers are, in theory, the ideal sheet configuration in that there is no "parasite" drag and no expensive porous support tube. Such fibers can be pressurized on the inside permitting "thin channel" fluid management of the water-bearing fluid. However, the biggest disadvantage of hollow fibers is the pressure constraint, which limits the cross-flow velocity down the lumen of the fiber. In addition, the hollow fiber configuration is more susceptible to fouling and plugging than the other three configurations; however, larger diameter fibers are becoming popular to improve fouling resistance. Fortunately, hollow fibers can be readily cleaned by back washing, which tends to compensate for their propensity to foul. In contrast, it is not recommended that tubes; plate and frame units; and spiral wound modules be back-washed, due to problems with membrane delamination and glue line seal rupture.

Flat sheets in a plate and frame unit offer the greatest versatility; they are also the most cost-prohibitive.

While spiral wound modules were originally developed for reverse osmosis; they are capturing an increased share of the ultrafiltration market by providing one of the least expensive ultrafiltration modules available in terms of cost per sheet area unit. Spiral wound units cannot be unwrapped for cleaning and most cannot be autoclaved. In terms of propensity to fouling, they are between hollow fibers and tubes (as well as the pricier plate and frame units).

Purification Methods

The present invention can optionally be combined with several well-known processes to purify fluids. These processes can be used to aid in the water-lipophilic fluid separation operations and/or be used to remove impurities from lipophilic fluid after it has been used.

Distillation is the process of producing a vapor from a liquid by heating the liquid in a vessel, then condensing the vapors and collecting them in another vessel. The types of distillation processes available are simple, fractional, steam, immiscible solvent, azeotropic, extractive, vacuum, molecular, entrainer sublimation, and freeze-drying.

Extraction is the selective transfer of a compound or compounds from one liquid to another immiscible liquid or from a solid to a liquid. The former process is called a liquid-liquid extraction and is an indirect separation technique because two components are not separated directly. A foreign substance, an immiscible liquid is introduced to provide a second phase. "Decantation" and "density gradation" are gravity-type separation methods. A "decanter" is defined as a vessel used to separate a stream continuously into two liquid phases using the force of gravity. Using Stokes' law, one can derive the settling velocity of the droplets in the continuous phase and design a decanter accordingly.

Ion exchange is a process whereby one type of ion in a compound is exchanged for a different ion of the same type: a cation for another cation and anion for another anion. Ion-exchange resins are typically utilized to carry out the exchange. All ion-exchange resins, whether cation or anion exchangers, strongly or weakly ionized, gel or macroporous, spherical or granular, can be viewed as solid solutions. Practically every observed ion-exchange behavior can be rationalized on the basis of distribution of components between two solutions phases, one of which is confined as a solid phase. Transfer of components takes place across the interface between the phases, which is the surface of the bead or granule. The inside phase of an ion-exchange resins contains four necessary components. The components include: a three-dimensional polymeric network, ionic functional groups permanently attached to the network, counter-ions, and a solvent. Under certain conditions, there may be other components inside the resin such as a second solvent, co-ions, and nonionic solutions.

Adsorption, by e.g. activated carbon, is an important unit operation for separation of liquids and utilizes surface phenomenon occurring on the surface of an adsorbent material. Adsorption occurs when the energy associated with a surface of a solid attracts molecular or ionic species from the liquid to the solid. The adsorbed material can form a layer on the surface from one to several molecules deep. The amount and properties of the surface and the environmental conditions at the surface will control adsorption. A number of highly porous solids adsorb water preferentially when contacted by wet solvent mixtures and can remove water to very low concentrations. While they can be used on a once-through basis, they are capable of being regenerated by heating. Molecular sieves are commonly used; however, organic adsorbents of the ion-exchange resin type are attractive alternatives.

Chromatography is a multistage separation technique based on the differences between compounds in adsorbing onto a surface or dissolving in a thin film of liquid. The more common chromatography types are paper, thin layer, high performance, gas, and gel permeation. The two major mechanisms at work during a chromatographic separation are displacement and partition.

Dialysis is the transfer of solute through a membrane as a result of a trans-membrane gradient in the concentration of the solute. It is accompanied by osmosis, which is a transfer of a solvent through a membrane as a result of a trans-membrane gradient in the concentration of the solvent. The direction of a solute transfer in dialysis is opposite that of solvent transfer in osmosis. Dialysis is effective in the removal of low molecular weight solute molecules or ions from a solution via their passage through a semi-permeable membrane driven by a concentration gradient.

Electro-dialysis is a process whereby the electrolytes are transferred through a system of solutions and membranes by an electrical driving force. As currently used, the term electro-dialysis refers to a multiple-compartment electro-dialysis with ion-exchange membranes. There are four variations of electrodialysis: electrolytic, concentration-diluting, ion substitution, and reversal.

Diafiltration differs from conventional dialysis in that the rate of microspecies removal is not dependent on concentration but is simply a function of the ultrafiltration rate (membrane area) relative to the volume to be exchanged or dialyzed. Repeated or continuous addition of fresh solvent flushes out or exchanges salts and other microspecies efficiently and rapidly.

Solids can be designed to adsorb water while rejecting solvents. Likewise, membranes can be designed to pass water and retain solvents or vice versa. The use of pervaporation for removing water from solvent-water mixtures involves the use of a hydrophilic membrane. The removal of solvents from water is identical except for the use of a membrane that rejects water while accepting lipophilic fluids.

Crystallization is the process of producing crystals from a vapor, a melt, or a solution and is distinguished from precipitation in that the latter usually exhibits extremely high levels of super-saturation, primary nucleation, and low solubility ratios.

Centrifugation is a technique that separates materials based upon differences in density, the rate of separation being amplified by applying increasing rotational force. The force is called a centrifugal force and the apparatus providing the rotational force is called a centrifuge.

Cartridge filtration is used primarily for the removal of solids from liquids. Specifically, low-solids-containing liquids are filtered such that they become optically clear solutions. The cartridges are cylindrical in configuration, with either pleated or non-pleated, disposable or cleanable, filter media. The filter media is usually integrally bonded to plastic or metal hardware.

Sedimentation is the separation of suspended solid particles from a liquid stream via gravitational settling. Sedimentation can also be used to separate solid particles based on differences in their settling rates.

Air stripping is a method whereby many organic solvents can be removed from wastewater to a level at which the water can be discharged. This method applies particularly to solvents that have a low solubility in water or a high volatility relative to water.

Desiccant Drying involves bringing a water-wet solvent into contact with a solid, usually an electrolyte, suited to withdraw the water and form a second phase. Water can then be removed from this second phase by other means (e.g. decantation).

Chemical Addition involves the addition of chemicals to change at least one physico-chemical property of the liquid such as pH, ionic strength, etceteras. Examples of these chemicals include salts, acids, bases, coagulants, and flocculants.

Enzyme, microbial, or bacterial addition involves the addition of enzymes, microbes, or bacteria to a waste stream to remove organic contaminants from the stream.

Temperature modification enhances the separation of binary mixtures and can include both cooling and/or heating of the mixture. Increasing the temperature of the mixtures aids coalescence while cooling aids the crystallization or freezing of one of the components.

Electrostatic coalescence involves exposing an emulsion containing two mutually insoluble phases (for example lipophilic fluid and water), wherein one phase is the continuous phase and the other is the discontinuous phase, to an electric field to affect coalescence of the discontinuous phase into droplets of a large enough size such that the droplets gravitate from the emulsion based on the density difference of the two phases. In order to carry this method out, the two phases must have at least a minor difference in dielectric constants and densities. Electric coalescence is a well-known process and is described in U.S. Pat. No. 3,207,686 to Jarvis et al.; U.S. Pat. No. 3,342,720 to Turner; U.S. Pat. No. 3,772,180 to Prestridge; U.S. Pat. No. 3,939,395 to Prestridge; U.S. Pat. No. 4,056,451 to Hodgson; U.S. Pat. No. 4,126,537 to Prestridge; U.S. Pat. No. 4,308,127 to Prestridge; and U.S. Pat. No. 5,861,089 to Gatti et al.

Absorption involves exposing an emulsion to a material that "absorbs" at least one component out of the emulsion. The absorbent material typically undergoes a volume change (either swelling or shrinkage) as contrasted with adsorption, which is primarily a surface phenomenon. In one example, one could utilize absorbent polymers to remove water from a solvent-water emulsion.

Embodiments

Process

The present invention is directed to a process for removing water from a lipophilic fluid and water emulsion. The process includes exposing the emulsion to an absorbent material, as discussed in detail above, in order to effect the removal of the water from the lipophilic fluid and water emulsion. The lipophilic fluid is recovered and termed "lipophilic fluid." Within this process, it is possible to add the optional initial steps of exposing a fabric to lipophilic fluid and water and then recovering the lipophilic fluid and water in the form of the lipophilic fluid and water emulsion.

The optional "recovering" step of the present invention may be carried out in several ways. Spinning the fabric load, including the lipophilic fluid and water is well known in conventional laundry applications. Wringing or twisting or squeezing the treated fabrics is also a well-known mechanical way to extract fluids from fabrics and fabric articles. Evaporation may also be employed to collect the lipophilic fluid and water and/or to dry the fabric load. Heating the fabric load, lipophilic fluid and water or other well-known means for evaporation may do this. Spinning and/or tumbling may be coupled with heating to assist evaporation and evaporation uniformity. If this method is employed, it will require subsequent condensation of any evaporated lipophilic fluid and water.

Although not required, it is also possible to pass the lipophilic fluid and water emulsion through a particulate matter filter such that particles and particle aggregates about 1 micron or larger are removed, preferably such that particles and particle aggregates about 5 microns or larger are removed, more preferably such that particles and particle aggregates about 10 microns or larger are removed, even more preferably such that particles and particle aggregates about 15 microns or larger are removed, even more preferably such that particles and particle aggregates about 25 microns or larger are removed. It is further possible to add to the process the step of exposing the lipophilic fluid and water emulsion to activated carbon prior to exposure to the absorbent material.

As previously discussed, the absorbent material may comprise surface cross-linked polymer, surface cross-linked polyacrylate, surface cross-linked polyacrylamide, or combinations of these absorbent materials. Further, any of the absorbent materials may have a fibrous morphology, a particulate morphology, or mixtures of any of the absorbent materials with similar or different morphologies. The absorbent material may take several forms, including but not limited to, a porous woven sheet impregnated with absorbent materials, a film, or a membrane.

In order to aid the absorption of water from and/or separation of the lipophilic fluid and water emulsion, it may be desirable to increase the temperature of the emulsion prior to exposing the emulsion to the absorbent material. If the emulsion is preheated, it is preferable to heat it by at least about 10° C. Preferably however, the temperature of the lipophilic fluid and water emulsion is at most about 50° C. prior to exposing the emulsion to absorbent material since some absorbent materials cannot absorb water at higher temperatures, particularly when temperature increase is one of their trigger or collapse mechanisms. Aside from heating the emulsion in order to aid the absorption of water from and/or separation of the lipophilic fluid and water emulsion, it may be additionally or alternatively desirable to cool the emulsion, and/or add demulsifying agents to the emulsion in order to aid the absorption of water from and/or separation of the lipophilic fluid and water emulsion.

Once the absorbent material has absorbed at least a portion of the water removed from the lipophilic fluid and water emulsion, it is desirable to trigger the absorbent material to release the removed water by exposing the absorbent material to a trigger mechanism including, but not limited to, light, pH, temperature, sound, electric field, pressure, ionic strength, vibration, and combinations of these trigger mechanisms. Absorbent material "trigger" or "collapse" mechanisms and methods for their introduction are well known in the absorbent material arts.

Once the emulsion is separated, the collected lipophilic fluid can be exposed to activated carbon in order to further facilitate its purification and recycling into the system. Further, the removed water may also be exposed to activated carbon prior to its disposal or recycling into the system. Methods to purify the collected or separated lipophilic fluid include well-known distillation processes, membrane filters, adsorption processes, absorption processes, extraction processes, ion exchange processes, air stripping processes, and chromatography.

The lipophilic fluid and water emulsion may also contain up to about 10% emulsifier by weight of the emulsion. If it does contain emulsifier, it is preferable for the lipophilic fluid and water emulsion to have a water/lipophilic fluid/emulsifier ratio of from about 1/98.9/0.1 to about 40/55/5 by weight of the emulsion. Further, as discussed in the "Adjunct Ingredients" section above, it is preferred that the emulsifier also contains a surfactant. Lastly, also as discussed in the aforementioned section, the lipophilic fluid and water emulsion may also contain adjunct ingredients selected from the group consisting of enzymes, bleaches, surfactants, fabric softeners, perfumes, antibacterial agents, antistatic agents, brighteners, dye fixatives, dye abrasion inhibitors, anti-crocking agents, wrinkle reduction agents, wrinkle resistance agents, soil release polymers, sunscreen agents, anti-fade agents, builders, sudsing agents, composition malodor control agents, composition coloring agents, pH buffers, waterproofing agents, soil repellency agents, and mixtures of these adjuncts.

In the present invention, it is preferred that the lipophilic fluid includes a linear siloxane, a cyclic siloxane, and mixtures of these siloxanes. It is more preferable that these siloxanes are selected from the group consisting of octamethylcyclotetrasiloxane, decamethylcyclopentasiloxane, dodecamethylcyclohexasiloxane, and mixtures of these siloxanes. It is even more preferred if the lipophilic fluid contains decamethylcyclopentasiloxane. Lastly, it is most preferred if the lipophilic fluid contains decamethylcyclopentasiloxane and is substantially free of octamethylcyclotetrasiloxane.

System

The present invention also includes a system for removing water from a lipophilic fluid and water emulsion. In addition to the following disclosure, the system can be capable of performing the previously described method including non-essential and preferred methods/limitations/modes of operation. Mainly, the system is capable of exposing a lipophilic fluid and water emulsion to an absorbent material in order to effect the removal of water from the emulsion wherein at least the lipophilic fluid is recovered as "collected lipophilic fluid." As in the method, the system may be additionally capable of initially exposing a fabric to a lipophilic fluid and water and recovering the lipophilic fluid and water in the form of a lipophilic fluid and water emulsion. The system may additionally be capable of passing the lipophilic fluid and water emulsion through a particulate matter filter such that particles and particle aggregates about 1 micron or larger are removed. As with the previously described method, the absorbent material may take the form of a porous woven sheet impregnated with absorbent polymers.

Composition

The present invention also includes a composition created while carrying out the methods or operating the systems of the present invention. The composition is not intended to be limited by what is described below. It may include any of the compositions created by the methods and/or systems describe above. The composition contains, at minimum, an absorbent material, lipophilic fluid, water, and emulsifier. It may also contain a spacer and and/or a high surface area material.

The absorbent material within the composition may include a surface cross-linked polymer like a surface cross-linked polyacrylate or a surface cross-linked polyacrylamide, and may contain mixtures of surface cross-linked polymers. Further, the absorbent material may have a fibrous morphology, a particulate morphology, or may contain mixtures of these morphologies.

The composition may further contain adjunct ingredients selected from the "Adjunct Ingredients" section hereinbefore including, but not limited to, enzymes, bleaches, surfactants, fabric softeners, perfumes, antibacterial agents, antistatic agents, brighteners, dye fixatives, dye abrasion inhibitors, anti-crocking agents, wrinkle reduction agents, wrinkle resistance agents, soil release polymers, sunscreen agents, anti-fade agents, builders, sudsing agents, composition malodor control agents, composition coloring agents, pH buffers, waterproofing agents, soil repellency agents, and mixtures of these adjuncts.

The methods and systems of the present invention may be used in a service, such as a dry cleaning service, diaper service, uniform cleaning service, or commercial business, such as a Laundromat, dry cleaner, linen service which is part of a hotel, restaurant, convention center, airport, cruise ship, port facility, casino, or may be used in the home.

The methods of the present invention may be performed in an apparatus that is a modified existing apparatus and is retrofitted in such a manner as to conduct the process of the present invention in addition to related processes.

The methods of the present invention may also be performed in an apparatus, which is not a modified existing apparatus but is one specifically built in such a manner so as to conduct the present invention or may be added to another apparatus as part of a lipophilic fluid processing system. This would include all the associated plumbing, such as connection to a chemical and water supply, and sewerage for waste wash fluids.

The systems of the present invention may be used in an apparatus, which is not a modified existing apparatus but is one specifically built in such a manner so as to conduct the present invention and related processes.

The methods of the present invention may also be performed in an apparatus capable of "dual mode" functions. A "dual mode" apparatus is one capable of both washing and drying fabrics within the same drum. These apparati are commercially available, particularly in Europe.

An apparatus used to carry out the present invention will typically contain some type of control system. These include electrical systems, such as, the so-called smart control systems, as well as more traditional electro-mechanical systems. The control systems would enable the user to select the size of the fabric load to be cleaned, the type of soiling, the extent of the soiling, the time for the cleaning cycle. Alternatively, the user could use pre-set cleaning and/or refreshing cycles, or the apparatus could control the length of the cycle, based on any number of ascertainable parameters. This would be especially true for electrical control systems. For example, when the collection rate of lipophilic fluid reaches a steady rate the apparatus could turn its self off after a fixed period of time, or initiate another process for the lipophilic fluid.

In the case of electrical control systems, one option is to make the control device a so-called "smart device". This could mean including, but not limited to, self diagnostic system, load type and cycle selection, linking the machine to the Internet and allowing for the consumer to start the apparatus remotely, be informed when the apparatus has cleaned a fabric article, or for the supplier to remotely diagnose problems if the apparatus should break down. Furthermore, if the system of the present invention is only a part of a cleaning system, the so called "smart system" could be communicating with the other cleaning devices which would be used to complete the remainder of the cleaning process, such as a washing machine, and a dryer.

What is claimed is:

1. A process for treating a fabric comprising the steps of:
   a. exposing a fabric to a lipophilic fluid and water, said lipophilic fluid being selected from the group consisting of linear or cyclic siloxanes, perfluorinated amines, C6 or higher diols, polyol esters, and mixtures thereof;
   b. recovering said lipophilic fluid and said water in the form of a lipophilic fluid and water emulsion from said fabric;
   c. exposing said lipophilic fluid and water emulsion to an absorbent matrix comprising an absorbent material comprising a polymer selected from the group consisting of surface cross-linked polyacrylate, surface cross-linked polyacrylamide and mixtures thereof, in order to effect the removal of said water from said lipophilic fluid and water emulsion such that the lipophilic fluid is recovered as collected lipophilic fluid.

2. A process according to claim 1 wherein said absorbent matrix comprises a spacer material in an amount from at least about 1% to at most about 50% by volume of the day bulk matrix and is selected from the group consisting of sand, silica, aluminosilicates, glass microspheres, clay, layered silicates, wood, natural textile materials, synthetic textile materials, alumina aluminum oxide, aluminum silicate, zinc oxide, molecular sieves, zeolites, activated carbon, diatomaceous earth, hydrated silica, mica, microcrystalline cellulose, montmorillonite, peach pit powder, pecan shell powder, talc, tin oxide, titanium dioxide, walnut shell powder, particles of different metals or metal alloys and mixtures thereof.

3. A process according to claim 2 wherein said spacer material is selected from the group consisting of particles made from polybutylene, polyethylene, polyisobutylene, polymethylstyrene, polypropylene, polystyrene, polyurethane, nylon, polytetrafluoroethylene and mixtures thereof.

4. A process according to claim 1 wherein said absorbent material comprises a high surface area material in an amount from at least about 1% to at most about 50% by volume of the dry bulk matrix.

5. A process according to claim 1 wherein said absorbent material has a morphology selected from the group consisting of fibrous morphology, particulate morphology and mixtures thereof.

6. A process according to claim 1 wherein said absorbent matrix is in a form selected from the group consisting of a porous woven sheet impregnated with absorbent materials, a film, a membrane and mixtures thereof.

7. A process according to claim 1 further comprising the step of pausing said lipophilic fluid and water emulsion through a particulate matter filter such that particles and particle aggregates about 1 micron or larger are removed.

8. A process according to claim 1 further comprising the step of exposing said lipophilic fluid and water emulsion to activated carbon.

9. A process according to claim 1 further comprising the step of triggering said absorbent material to release said removed water by exposing said absorbent material to a trigger mechanism selected from the group consisting of light, pH, temperature, sound, electric field, pressure, ionic strength, vibration and mixtures thereof.

10. A process according to claim 1 wherein the temperature of said lipophilic fluid and water emulsion is at least about 10° C. and at most about 50° C. prior to exposing said emulsion to said absorbent material.

11. A process according to claim 1 further comprising the step of exposing said collected lipophilic fluid to activated carbon.

12. A process according to claim 1 further comprising the step of exposing said removed water to activated carbon.

13. A process according to claim 1 wherein said lipophilic fluid and water emulsion comprises up to about 10% emulsifier by weight of the emulsion.

14. A process according to claim 1 wherein said lipophilic fluid comprises a linear siloxan and/or a cyclic siloxane.

15. A process according to claim 1 wherein said lipophilic fluid comprises decamethylcyclopentasiloxane.

16. A process according to claim 1 wherein said lipophilic fluid and water emulsion also comprises adjunct ingredients selected from the group consisting of enzymes, bleaches, surfactants, fabric softeners, perfumes, antibacterial agents, antistatic agents, brighteners, dye fixatives, dye abrasion inhibitors, anti-crocking agents, wrinkle reduction agents, wrinkle resistance agents, soil release polymers, sunscreen agents, anti-fade agents, builders, sudsing agents, composition malodor control agents, composition coloring agents, pH buffers, waterproofing agents, soil repellency agents and mixtures thereof.

\* \* \* \* \*

UNITED STATES PATENT AND TRADEMARK OFFICE
CERTIFICATE OF CORRECTION

PATENT NO. : 6,855,173 B2 Page 1 of 1
APPLICATION NO. : 09/849554
DATED : May 4, 2001
INVENTOR(S) : Ehrnsperger et al.

It is certified that error appears in the above-identified patent and that said Letters Patent is hereby corrected as shown below:

Column 24, line 65 – delete "day" Insert --dry--

Column 25, line 28 – delete "pausing" Insert --passing--

Signed and Sealed this

Second Day of January, 2007

JON W. DUDAS
*Director of the United States Patent and Trademark Office*

UNITED STATES PATENT AND TRADEMARK OFFICE
CERTIFICATE OF CORRECTION

PATENT NO.        : 6,855,173 B2
APPLICATION NO. : 09/849554
DATED             : February 15, 2005
INVENTOR(S)       : Ehrnsperger et al.

It is certified that error appears in the above-identified patent and that said Letters Patent is hereby corrected as shown below:

Column 24, line 65 – delete "day" Insert --dry--

Column 25, line 28 – delete "pausing" Insert --passing--

This certificate supersedes Certificate of Correction issued January 2, 2007.

Signed and Sealed this

Thirtieth Day of January, 2007

JON W. DUDAS
*Director of the United States Patent and Trademark Office*